United States Patent

Renner et al.

(10) Patent No.: US 6,351,147 B1
(45) Date of Patent: Feb. 26, 2002

(54) CONFIGURATION AND METHOD FOR MATCHING OUTPUT DRIVERS OF INTEGRATED CIRCUITS TO SPECIFIED CONDITIONS

(75) Inventors: Franz Renner, Wörth; Jens Rosenbusch, Unterhaching, both of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/199,848

(22) Filed: Nov. 25, 1998

(30) Foreign Application Priority Data

Nov. 26, 1997 (DE) .......................... 197 52 421

(51) Int. Cl.[7] .......................................... H03K 19/0175
(52) U.S. Cl. .............................. 326/82; 326/26; 326/32
(58) Field of Search .............................. 326/22, 23, 26, 326/27, 29, 31, 32, 82, 83, 86, 87

(56) References Cited

U.S. PATENT DOCUMENTS

| 3,725,789 A | | 4/1973 | Mager | |
|---|---|---|---|---|
| 4,719,369 A | * | 1/1988 | Asano et al. | 326/87 |
| 4,890,051 A | * | 12/1989 | Kim et al. | 326/83 |
| 4,975,598 A | * | 12/1990 | Borkar | 326/83 |
| 5,568,068 A | | 10/1996 | Ota et al. | |
| 5,587,863 A | | 12/1996 | Bergström et al. | 361/93 |
| 5,598,119 A | * | 1/1997 | Thayer et al. | 326/83 |
| 5,623,277 A | | 4/1997 | Lippmann et al. | 345/87 |
| 5,751,160 A | * | 5/1998 | Baek et al. | 326/83 |
| 5,923,183 A | * | 7/1999 | Kim et al. | 326/86 |
| 5,929,654 A | * | 7/1999 | Park et al. | 326/83 |
| 5,994,922 A | * | 11/1999 | Aoki et al. | 326/83 |

FOREIGN PATENT DOCUMENTS

| EP | 0301736 | 7/1988 |
|---|---|---|
| EP | 0 301 736 A1 | 2/1989 |
| EP | 0510221 A1 | 10/1992 |
| EP | 0523833 A1 | 1/1993 |
| EP | 0609529 A1 | 8/1994 |

* cited by examiner

Primary Examiner—Michael Tokar
Assistant Examiner—Don Phu Le
(74) Attorney, Agent, or Firm—Herbert L. Lerner; Laurence A. Greenberg; Werner H. Stemer

(57) ABSTRACT

A configuration and a method for matching output drivers of integrated circuits to specified conditions include parameters to be taken into account when matching output drivers and/or control signals based on the parameters for matching the output drivers, to be provided in digital form. The configuration and method may additionally or alternatively perform matching by taking into account a level or waveform of a supply voltage of an integrated circuit and/or a technology used in the integrated circuit and/or technical data on a load to be driven and/or demands placed on the output drivers by the load to be driven.

5 Claims, 1 Drawing Sheet

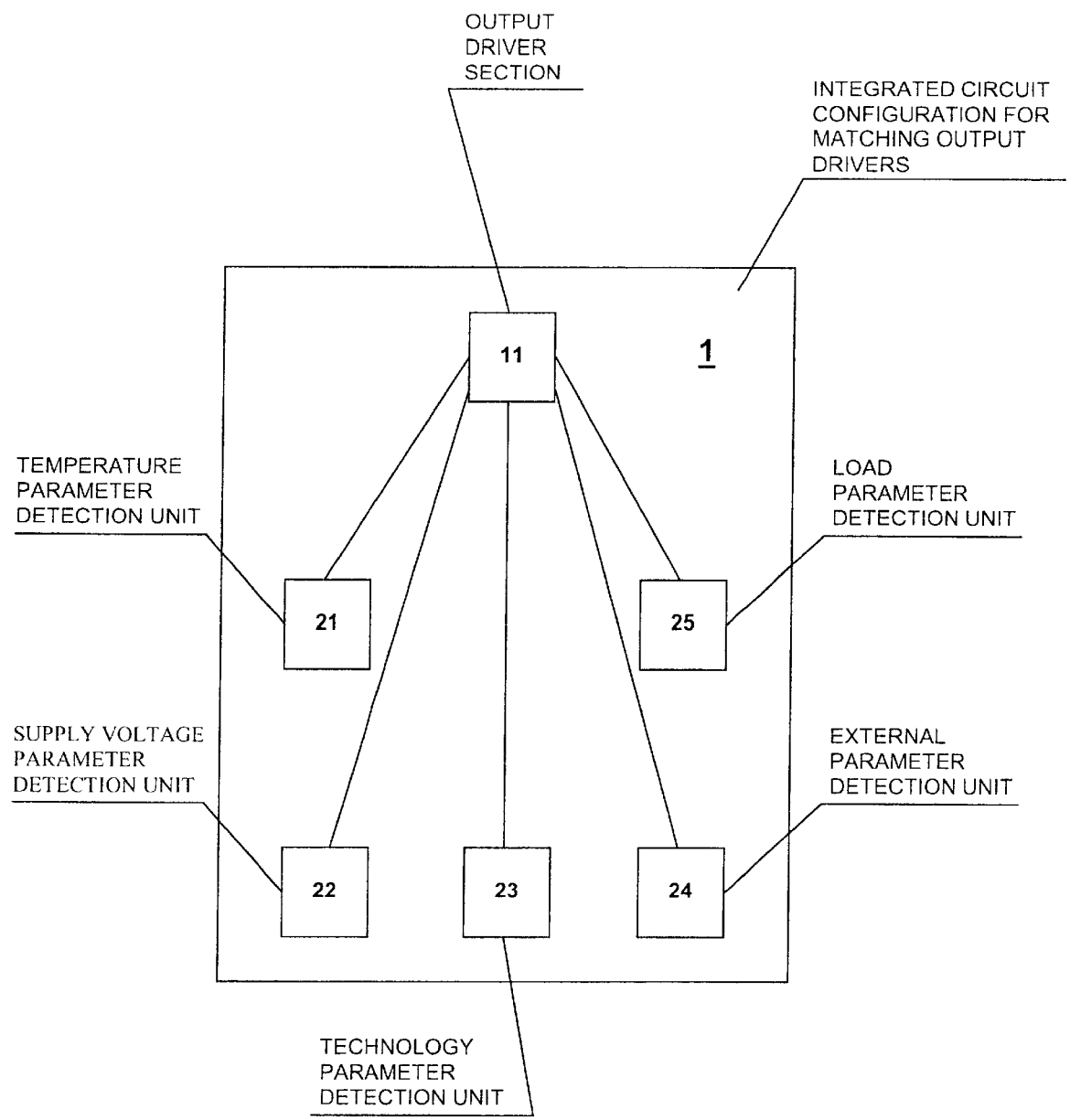

CONFIGURATION AND METHOD FOR MATCHING OUTPUT DRIVERS OF INTEGRATED CIRCUITS TO SPECIFIED CONDITIONS

BACKGROUND OF THE INVENTION

FIELD OF THE INVENTION

The present invention relates to configurations and methods for matching output drivers of integrated circuits to specified conditions.

Such configurations and methods are used for temperature compensation, for example. In that instance, pre-drivers for output transistors are controlled by taking into account an analog voltage which is a function of temperature.

Matching the output drivers in that manner is generally very advantageous. Nevertheless, from time to time there are instances in which the matching is not satisfactory, or not fully satisfactory anyway.

SUMMARY OF THE INVENTION

It is accordingly an object of the invention to provide a configuration and a method for matching output drivers of integrated circuits to specified conditions, which overcome the hereinafore-mentioned disadvantages of the heretofore-known devices and methods of this general type in such a manner that they can be used under all circumstances to achieve optimum matching of the output drivers of integrated circuits to the specified conditions.

With the foregoing and other objects in view there is provided, in accordance with the invention, a configuration for matching output drivers of integrated circuits to specified conditions, comprising digital parameters to be taken into account when matching output drivers, and/or digital control signals based on the parameters for matching output drivers.

In accordance with another feature of the invention, the parameters to be taken into account when matching the output drivers and/or the control signals based on the parameters for matching the output drivers, are produced digitally, or are digitized immediately after they have been produced.

In accordance with a further feature of the invention, the parameters to be taken into account when matching the output drivers and/or the control signals based on the parameters for matching the output drivers, are transmitted digitally to the output drivers.

With the objects of the invention in view, there is also provided a method for matching output drivers of integrated circuits to specified conditions, which comprises providing parameters to be taken into account when matching output drivers and/or control signals based on the parameters for matching the output drivers, in digital form.

In accordance with another mode of the invention, there is provided a method which comprises selecting the parameters to be taken into account as a temperature of an integrated circuit or its environment and/or a level or waveform of a supply voltage of the integrated circuit and/or a technology used in the integrated circuit and/or technical data on a load to be driven and/or demands placed on the output drivers by the load to be driven.

With the objects of the invention in view, there is additionally provided a configuration for matching output drivers of integrated circuits to specified conditions, comprising a device for performing matching by taking into account a level or waveform of a supply voltage of an integrated circuit, and/or a technology used in the integrated circuit, and/or technical data on a load to be driven and/or demands placed on output drivers by the load to be driven.

In accordance with a further feature of the invention, the parameters to be taken into account when matching the output drivers and/or control signals to be used for matching the output drivers, are provided in digital form.

With the objects of the invention in view, there is furthermore provided a method for matching output drivers of integrated circuits to specified conditions, which comprises performing matching by taking into account a level or waveform of a supply voltage of an integrated circuit, and/or technology used in the integrated circuit, and/or technical data on a load to be driven and and/or demands placed on output drivers by the load to be driven.

Taking into account such states as the level or waveform of the supply voltage of the integrated circuit and/or the technology used in the integrated circuit and/or the technical data on the load to be driven and/or the demands placed on the output drivers by the load to be driven, allows the output drivers of the integrated circuit to be matched more precisely to the specified conditions than is possible if merely the temperature is considered. In this instance, it is possible, among other things, to define and vary the maximum value of the current output by the output drivers on an individual basis while the integrated circuit is in operation. Such current limiting makes it possible, for example, to allow the current to become just as large as is necessary for correctly driving the load to be driven by the output drivers. This makes it possible to avoid unnecessarily large currents and/or unnecessarily steep edges in the waveform of the signals output by the output drivers. This, in turn, has the positive effect of permitting the electromagnetic radiation produced by the current flow to be reduced to the respective minimum. The integrated circuit and circuit components disposed in the close vicinity thereof are not exposed to electromagnetic radiation more than is absolutely necessary.

Among other things, providing the parameters to be taken into account when matching the output drivers, and/or the control signals based on the parameters, in digital form, enables:

the parameters and/or control signals to be transmitted, with as little interference as possible, from the location where they are produced to the output driver which is to be matched;

the parameters and/or control signals not to be produced all at once (because they can be stored);

the parameters and/or control signals to be output singly from the integrated circuit, particularly for test purposes; and the user to be given the opportunity to influence the matching of the output drivers (because digital signals are considerably easier to process than analog signals).

The advantages of these and other opportunities are clear: even after they have been manufactured (while the integrated circuit is in operation), the output drivers can still be extremely easily matched precisely to the respective conditions and individual requirements.

Configurations and methods have therefore been found which can be used to operate the output drivers of integrated circuits optimally under all circumstances.

Other features which are considered as characteristic for the invention are set forth in the appended claims.

Although the invention is illustrated and described herein as embodied in a configuration and a method for matching output drivers of integrated circuits to specified conditions, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a block circuit diagram of an integrated circuit having output drivers to be adjusted.

DESCRIPTION OF THE PREFERRED EMBODIMENTS

Referring now in detail to the single FIGURE of the drawing, there is seen an example of an integrated circuit, which is presumed to be a microprocessor or a microcontroller. However, the illustration represents no limitation and the invention may also be used for any other integrated circuits.

The integrated circuit has a multiplicity of non-illustrated input and/or output connections. At least some of those connections which can act as output connections have output drivers connected upstream thereof. In this configuration, the output drivers are responsible for ensuring that a signal to be output is output with a specified, or a specified maximum, voltage and/or a specified, or a specified maximum, current intensity.

According to the invention, the output drivers are constructed to be configurable and operable in dependence on specific states while the integrated circuit is in operation. In the example under consideration, these states are the temperature of the integrated circuit or its environment and/or the level or waveform of the supply voltage of the integrated circuit and/or the technology used in the integrated circuit and/or the technical data on the load to be driven and/or the demands placed on the output drivers by the load to be driven.

In the example under consideration, the strength of the output drivers (their internal resistance) can be varied depending on the above-mentioned parameters or state information. This may be carried out, for example, by constructing the output drivers using transistors connected in parallel, and by varying the number of transistors forming an output driver in dependence on those parameters.

However, the invention is not limited thereto. The driver strength may also be changed other than by varying the number of parallel transistors (for example, transistors or transistor panels of different powers may also be interchanged), nor is it the driver strength which has to be varied in dependence on those parameters (in addition, it is possible to "merely" vary the normal level of the signals output by the output drivers, for example).

The integrated circuit shown in the FIGURE is designated therein by reference numeral 1. The output drivers of the integrated circuit 1 which are to be adjusted as described are accommodated in one or more output driver sections 11. The at least one output driver section 11 is connected through conductor tracks to parameter detection sections 21 to 25. The parameter detection sections 21 to 25 contain parameter detection units which detect parameters in dependence on which of the output drivers of the output driver section 11 are to be driven.

The parameter detection units provided in the parameter detection sections 21 to 25 are constructed as follows:

the parameter detection unit in the parameter detection section 21 serves to detect a temperature of a chip or of an environment of the chip accommodating the integrated circuit;

the parameter detection unit in the parameter detection section 22 serves to detect a level and/or waveform of a supply voltage of the integrated circuit 1;

the parameter detection unit in the parameter detection section 23 serves to detect a technology used in the integrated circuit;

the parameter detection unit in the parameter detection section 24 serves to detect technical data on a load to be driven and/or demands placed on the output drivers by the load to be driven; and the parameter detection unit in the parameter detection section 25 serves to receive any other state information or parameters input externally by other circuit components or by a user.

Each of the parameter detection sections 21 to 25 may be provided in any number, and the individual parameter detection sections 21 to 25 may be disposed at arbitrary points in the integrated circuit. Individual or numbers of parameter detection sections may also be combined to form joint parameter detection sections.

It may turn out to be advantageous if the operation of one or more parameter detection sections 21 to 25 can be controlled by other components of the integrated circuit (by the respective other parameter detection sections, for example) and/or from outside the integrated circuit 1 (by other circuit components and/or user input). The scope of control includes, in particular, setting a sensitivity for the variable to be detected by the relevant parameter detection unit, setting threshold values for the variable to be detected by the relevant parameter detection unit, the manner of reacting to specific events, and activation and/or deactivation of the respective parameter detection units.

The parameters detected by the parameter detection units of the parameter detection sections 21 to 25, or signals representing these parameters, or control signals based on these parameters for driving the output drivers, are transmitted to the at least one output driver section 11 and used there for driving the output drivers.

The data and/or (control) signals to be transmitted are preferably transmitted in digital form. That is to say they are either generated digitally by the parameter detection units themselves or are digitized before leaving the parameter detection sections 21 to 25.

Alternatively, provision may be made for the data and/or (control) signals which are to be transmitted not to be digitized until later, that is to say for them to be transmitted in digital form only for part of the way to the output drivers.

Transmitting the data and/or (control) signals in digital form enables them to be transmitted essentially without interference. Furthermore, it is also a very simple matter to perform any necessary evaluation or additional processing of the data and/or (control) signals in the output driver section 11: in contrast to analog data, digital data can be additionally processed, subjected to logic combinations and stored without any difficulty.

The capability to store the data and/or (control) signals means that they do not have to be determined and transmitted (distributed over the integrated circuit) continually, but only once (after the integrated circuit is put into operation, for example) and/or only at time intervals of varying length.

This allows the power consumption and heating of the integrated circuit to be reduced to a minimum.

The fact that the data and/or (control) signals are present in digital form also makes it possible for them to be output with relatively little effort through the output connections of the integrated circuit. That means that the correct operation of the parameter detection units can be tested in an extremely simple and reliable matter.

This fact and the multitude and type of the state information or parameters used to drive the output drivers enables the output drivers to be adjusted in an optimum manner. Thus, the fact that driving the output drivers is dependent on the load to be driven, whose technical data and/or demands on the output driver may be maintained by user input, for example, makes it possible to optimize the output drivers in terms of electromagnetic compatibility (EMC) for the first time: limiting the current flow to the necessary extent permits the electromagnetic radiation produced by the current flow to be reduced to a minimum.

Finally, in conclusion, it may be stated that the configuration and method described herein allow the output drivers of integrated circuits to be operated simply, reliably and optimally under all circumstances.

We claim:

1. A configuration for matching output drivers of integrated circuits to specified conditions, comprising:
   at least one of:
      digital parameters to be taken into account when matching output drivers; and
      digital control signals based on said digital parameters for matching output drivers;
   said digital parameters selected from the group consisting of a level of a supply voltage of the integrated circuit, a waveform of a supply voltage of the integrated circuit, a technology used in the integrated circuit, and technical data on a load to be driven.

2. The configuration according to claim 1, wherein at least one of said parameters to be taken into account when matching the output drivers and said control signals based on said parameters for matching the output drivers, are produced digitally.

3. The configuration according to claim 1, wherein at least one of said parameters to be taken into account when matching the output drivers and said control signals based on said parameters for matching the output drivers, are digitized immediately after they have been produced.

4. The configuration according to claim 1, wherein at least one of said parameters to be taken into account when matching the output drivers and said control signals based on said parameters for matching the output drivers, are transmitted digitally to the output drivers.

5. A method for matching output drivers of integrated circuits to specified conditions, which comprises:
   providing at least one of:
      digital parameters to be taken into account when matching output drivers; and
      digital control signals based on the digital parameters for matching the output drivers; the digital parameters selected from the group consisting of a level of a supply voltage of the integrated circuit, a waveform of a supply voltage of the integrated circuit, a technology used in the integrated circuit, and technical data on a load to be driven.

* * * * *